United States Patent
Hatfield

(10) Patent No.: US 11,940,061 B2
(45) Date of Patent: Mar. 26, 2024

(54) VALVE FOR CONTROLLING A FLOW OF A FLUID

(71) Applicant: TTP Ventus Ltd, Hertfordshire (GB)

(72) Inventor: Stuart Hatfield, Hertfordshire (GB)

(73) Assignee: TTP VENTUS LTD, Hertfordshire (GB)

(*) Notice: Subject to any disclaimer, the term of this patent is extended or adjusted under 35 U.S.C. 154(b) by 0 days.

(21) Appl. No.: 17/795,707

(22) PCT Filed: Jan. 18, 2021

(86) PCT No.: PCT/GB2021/050109
§ 371 (c)(1),
(2) Date: Jul. 27, 2022

(87) PCT Pub. No.: WO2021/152288
PCT Pub. Date: Aug. 5, 2021

(65) Prior Publication Data
US 2023/0109570 A1    Apr. 6, 2023

(30) Foreign Application Priority Data
Jan. 28, 2020  (GB) .................................... 2001175

(51) Int. Cl.
*F16K 99/00* (2006.01)

(52) U.S. Cl.
CPC ...... *F16K 99/0007* (2013.01); *F16K 99/0028* (2013.01); *F16K 2099/0073* (2013.01);
(Continued)

(58) Field of Classification Search
CPC .. F04B 39/1073; F16K 15/16; Y10T 137/784; Y10T 137/7843; Y10T 137/7891
See application file for complete search history.

(56) References Cited

U.S. PATENT DOCUMENTS

| | | | | |
|---|---|---|---|---|
| 1,451,033 A | * | 4/1923 | Todd | F04B 39/0016 |
| | | | | 137/854 |
| 4,002,034 A | * | 1/1977 | Muhring | E02B 3/126 |
| | | | | 210/136 |

(Continued)

FOREIGN PATENT DOCUMENTS

| | | |
|---|---|---|
| DE | 19823704 A1 | 12/1999 |
| DE | 102011108380 A1 | 1/2013 |

(Continued)

OTHER PUBLICATIONS

Written Opinion dated Apr. 6, 2021; International Application No. PCT/GB2021/050109; International Filing Date Jan. 18, 2021 (6 pgs).

(Continued)

*Primary Examiner* — Robert K Arundale
(74) *Attorney, Agent, or Firm* — CANTOR COLBURN LLP

(57) ABSTRACT

A valve for controlling a flow of a fluid comprises: a sealing plate comprising a plurality of ports for passage of the fluid through the sealing plate in a direction substantially perpendicular to the plane of the sealing plate; and a plurality of valve members, each valve member comprising at least one anchor portion arranged in fixed relationship with the sealing plate and a closure portion which is contiguous with the anchor portion and in movable relationship with the sealing plate under a differential pressure of the fluid across the valve, the closure portion being movable away from the sealing plate under a first differential pressure direction to open at least one of the ports and toward the sealing plate under a second and opposite differential pressure direction to close said at least one of the ports. The anchor portions of the plurality of valve members partition the closure portions from each other such as to define a plurality of valve cells, (Continued)

each valve cell comprising one of the valve members and at least one associated port.

10 Claims, 16 Drawing Sheets

(52) U.S. Cl.
CPC ... *F16K 2099/0086* (2013.01); *Y10T 137/784* (2015.04); *Y10T 137/7843* (2015.04)

(56) References Cited

U.S. PATENT DOCUMENTS

| | | | | | |
|---|---|---|---|---|---|
| 4,167,200 | A | * | 9/1979 | Bouteille | F15B 13/04 137/884 |
| 4,645,500 | A | * | 2/1987 | Steer | A61F 13/513 604/378 |
| 5,247,912 | A | * | 9/1993 | Boyesen | F01L 3/205 123/73 V |
| 5,327,932 | A | * | 7/1994 | Rozek | F04B 39/1073 137/856 |
| 5,709,535 | A | * | 1/1998 | Enomoto | F04B 39/1073 417/560 |
| 5,794,654 | A | * | 8/1998 | Marvonek | F01L 3/205 137/512.2 |
| 6,022,199 | A | * | 2/2000 | Yoshii | F04B 39/1066 417/560 |
| 7,028,649 | B1 | * | 4/2006 | Hosaluk | F01L 3/205 123/73 V |
| 2003/0091433 | A1 | * | 5/2003 | Tam | F04D 25/14 415/206 |
| 2006/0016482 | A1 | * | 1/2006 | Berens | F16K 15/031 137/512.15 |
| 2011/0079299 | A1 | | 4/2011 | Yuguchi et al. | |
| 2011/0186765 | A1 | * | 8/2011 | Jaeb | F04B 53/106 29/890.12 |
| 2011/0284086 | A1 | * | 11/2011 | Cewers | F15D 1/02 137/561 R |
| 2012/0138180 | A1 | * | 6/2012 | Buckland | F04B 43/043 137/843 |
| 2015/0030484 | A1 | * | 1/2015 | Rosa | F16K 15/144 417/559 |
| 2017/0068255 | A1 | * | 3/2017 | Lee | F16K 15/144 |

FOREIGN PATENT DOCUMENTS

WO 2006111775 A1 10/2006
WO 2010139917 A1 12/2010

OTHER PUBLICATIONS

International Search Report for PCT/GB2021/050109 dated Apr. 6, 2021. 4 pgs.

* cited by examiner

VALVE FOR CONTROLLING A FLOW OF A FLUID

CROSS-REFERENCE TO RELATED PATENT APPLICATIONS

The present application is a national phase entry under 35 U.S.C. § 371 of International Application No. PCT/GB2021/050109 filed Jan. 18, 2021, published in English which claims priority from GB Application No. 2001175.5 filed Jan. 28, 2020, all of which are incorporated herein by reference.

BACKGROUND

Many portable electronic devices, including medical devices, require pumps for delivering a positive pressure or providing a vacuum that are relatively small in size, and it is advantageous for such pumps to be inaudible in operation so as to provide discrete operation. To achieve the desired objectives of small size, high efficiency, and inaudible operation, such pumps must operate at very high frequencies, in turn requiring valves that must operate at very high frequencies to be effective, typically of around 20 kHz and higher. One such high frequency pump, having a substantially disc-shaped cavity with a high aspect ratio, i.e., the ratio of the radius of the cavity to the height of the cavity, is disclosed in international patent publications WO 2006/111775 and WO 2010/139917, the entire contents of which are herein incorporated by reference.

To operate at these high frequencies, the valve must be responsive to a high frequency oscillating pressure that can be rectified to create a net flow of fluid through the pump. One such valve that is suitable for operating at frequencies of 20 kHz, and higher, is described in international patent publication WO 2010/139917, the entire content of which is herein incorporated by reference.

The valve described in the prior art has a moving valve flap and stationary valve plates each with multiple small holes to provide low flow restriction (required for high performance) despite the small hole sizes (required for valve robustness). One drawback of the design in the prior art is that when damage occurs to the valve flap due to impact, abrasion or other degradation mechanisms, these imperfections in the thin, moving valve flap may propagate through the thin valve, affecting larger areas and causing more significant degradation of the device.

The present invention aims to provide an improved valve which overcomes these problems.

SUMMARY OF THE INVENTION

According to an aspect of the invention, there is provided a valve for controlling a flow of a fluid, the valve comprising: a sealing plate comprising a plurality of ports for passage of the fluid through the sealing plate in a direction substantially perpendicular to the plane of the sealing plate; and a plurality of valve members, each valve member comprising at least one anchor portion arranged in fixed relationship with the sealing plate and a closure portion which is contiguous with the anchor portion and in movable relationship with the sealing plate under a differential pressure of the fluid across the valve, the closure portion being movable away from the sealing plate under a first differential pressure direction to open at least one of the ports and toward the sealing plate under a second and opposite differential pressure direction to close said at least one of the ports, wherein the anchor portions of the plurality of valve members partition the closure portions from each other such as to define a plurality of valve cells, each valve cell comprising one of the valve members and at least one associated port.

The provision of a plurality of valve cells prevents catastrophic failure of the valve, since any failure (crack or tear) of the valve material in one cell will not propagate to an adjacent cell, due to the presence of the anchor portion which partitions said one cell from said adjacent cell.

At least one of the valve members may be non-contiguous with an adjacent one of the valve members.

Each valve member may comprise a portion of a unitary sheet of the valve.

An anchor portion of at least one of the valve members may be connected to an anchor portion of an adjacent one of the valve members by an intermediary portion of the unitary sheet.

An anchor portion of at least one of the valve members may comprise an anchor portion of an adjacent one of the valve members.

At least one of the valve members may comprise a single anchor portion located on the sealing plate adjacent one of the ports, the closure portion of said at least one of the valve members comprising a flap, the flap being arranged to extend over said one of the ports in contact with the sealing plate so as to cover said one of the ports, the flap being pivotable about the single anchor portion so as to be movable away from the sealing plate under the first direction of the differential pressure to open said one of the ports and to the sealing plate under the second and opposite direction of the differential pressure to close said one of the ports.

At least one of the valve members may comprise an elastic sheet including a peripheral edge, first and second anchor portions of said at least one of the valve members comprising respective first and second portions of the peripheral edge and being located on the sealing plate adjacent one of the ports so as to be in opposing relationship with each other along a first axis of the sealing plate, the closure portion of said at least one of the valve members comprising a closure part of the elastic sheet, the closure part extending between the first and second anchor portions and being arranged to contact the sealing plate so as to cover said one of the ports, the closure part comprising portions of the peripheral edge of the elastic sheet in movable relationship with the sealing plate, the closure part being configured to stretch away from the sealing plate under the first direction of the differential pressure to open said one of the ports and to contract to the sealing plate under the second and opposite direction of the differential pressure to close said one of the ports.

The elastic sheet may have a rectangular shape, the four sides of the rectangle comprising the peripheral edge of the elastic sheet, the first and second anchor portions comprising a pair of opposing sides of the rectangle, the portions of the peripheral edge in movable relationship with the sealing plate comprising another pair of opposing sides of the rectangle.

The elastic sheet may have a cruciform shape, sides of the cruciform comprising the peripheral edge of the elastic sheet, the first and second anchor portions comprising a pair of opposing sides of the cruciform, third and fourth anchor portions of said at least one of the valve members comprising respective third and fourth portions of the peripheral edge and being located on the sealing plate adjacent said one of the ports so as to be in opposing relationship with each other along a second axis of the sealing plate which is perpendicular to the first axis, the third and fourth anchor portions thereby comprising another pair of opposing sides of the cruciform, the portions of the peripheral edge in movable relationship with the sealing plate comprising further sides of the cruciform.

At least one of the valve members may comprise an elastic sheet including a peripheral edge, a single anchor portion of said at least one of the valve members comprising the entire peripheral edge and being located on the sealing plate adjacent one of the ports so as to surround said one of the ports, the closure portion of said at least one of the valve members comprising a closure part of the elastic sheet, the closure part being surrounded by the single anchor portion and being arranged to contact the sealing plate so as to cover said one of the ports, the closure part comprising at least one aperture which is offset from the said one of the ports in the plane of the sealing plate so as to be covered by the sealing plate when the closure part is in contact with the sealing plate, the closure part being configured to stretch away from the sealing plate under the first direction of the differential pressure to open said one of the ports and said aperture and to contract to the sealing plate under the second and opposite direction of the differential pressure to close said one of the ports and said aperture.

The elastic sheet may have a circular shape, the circumference of the circle comprising the peripheral edge of the elastic sheet.

The elastic sheet may comprise a plurality of said apertures arranged to encircle said one of the ports.

The sealing plate may comprise a circular recess which surrounds said one of the ports, each one of the plurality of said apertures being located over the circular recess.

Said one of the ports may comprise a protruding lip for sealing contact with the closure part of the elastic sheet.

The elastic sheet of said at least one of the valve members may be non-contiguous with the elastic sheet of said adjacent one of the valve members.

The elastic sheet may comprise said portion of the unitary sheet of the valve.

The valve may comprise a frame plate located over the sealing plate, the frame plate comprising a plurality of apertures each being aligned with an associated one of the plurality of ports of the sealing plate, the anchor portions being disposed between the sealing plate and the frame plate, the frame plate being attached to the sealing plate such as to fix the anchor portions relative to the sealing plate.

The frame plate may be attached to the sealing plate by a weld, an adhesive bond, heat staking, or mechanical clamping.

The valve may comprise:
a frame plate located over the sealing plate, the frame plate comprising a plurality of apertures, each one of the apertures being aligned with an associated one of the plurality of ports of the sealing plate, the anchor portions being disposed between the sealing plate and the frame plate; and
a retention plate located over the frame plate and attached to the sealing plate such as to fix the frame plate and the anchor portions relative to the sealing plate, the retention plate comprising a plurality of holes.

Each one of the plurality of holes of the retention plate may be aligned with either an associated one of the plurality of ports of the sealing plate or an associated one of the plurality of apertures of the elastic sheet.

The retention plate may be porous.

The retention plate may be located on the sealing plate, the anchor portions being disposed between the retention plate and the sealing plate, the retention plate being attached to the sealing plate such as to fix the anchor portions relative to the sealing plate, the retention plate comprising a plurality of holes.

Each one of the plurality of holes of the retention plate may be aligned with an associated one of the plurality of ports of the sealing plate.

The retention plate may be porous.

The anchor portions may be fixedly bonded to the sealing plate by an adhesive.

The sealing plate may be constructed from a metal or a metal alloy.

The sealing plate may be constructed from a polymer material.

At least one of the plurality of valve members may be constructed from a metal or a metal alloy.

At least one of the plurality of valve members may be constructed from a polymer material.

At least one of the plurality of valve members may be constructed from a semiconductor material.

Each of the plurality of valve cells may have a length of less than 1000 µm, preferably less than 500 µm; the closure portion may be movable away from the sealing plate under the first differential pressure by a distance of less than 100 µm, preferably less than 50 µm; and the material of said one of the valve members may have: Young's Modulus less than 50 GPa; thickness less than 50 µm, preferably less than 10 µm; and density less than 3000 kg/m$^3$, preferably less than 1500 kg/m$^3$.

According to another aspect of the invention, there is provided a method of making a valve for controlling a flow of a fluid, the method comprising: providing a sealing plate comprising a plurality of ports each extending transversely through the sealing plate in a direction substantially perpendicular to the plane of the sealing plate; fixedly attaching portions of a unitary sheet to the sealing plate so as to define a plurality of anchor portions of the unitary sheet, each one of the anchor portions being located adjacent at least one of the plurality of ports; and forming partings or discontinuities in the unitary sheet to define a plurality of closure portions of the unitary sheet, such that each one of the closure portions is contiguous with at least one of the anchor portions, each one of the closure portions being movable away from the sealing plate to uncover at least one of the ports and toward the sealing plate to cover said at least one of the ports, the unitary sheet thereby comprising a plurality of valve members, each valve member comprising at least one anchor portion and a closure portion, the closure portions being partitioned from each other by the anchor portions such as to define a plurality of valve cells, each valve cell comprising one of the valve members and at least one associated port of the sealing plate.

Forming the partings or discontinuities in the unitary sheet to define the plurality of closure portions of the unitary sheet may comprise configuring each of an adjacent two of the closure portions to be contiguous with a same one of the anchor portions, such that said two of the closure portions are partitioned by said one of the anchor portions.

Fixedly attaching portions of the unitary sheet to the sealing plate may comprise spacing one of the anchor portions from an adjacent one of the anchor portions in the plane of the sealing plate, such that said at least one of the anchor portions is connected to said adjacent one of the anchor portions by an intermediary portion of the unitary sheet.

The method may further comprise removing said intermediary portion of the unitary sheet, such that said one of the anchor portions and said adjacent one of the anchor portions are non-contiguous.

Removing said intermediary portion of the unitary sheet may comprise cutting the unitary sheet.

Removing said intermediary portion of the unitary sheet may comprise etching the unitary sheet.

Removing said intermediary portion of the unitary sheet may comprise laser ablating the unitary sheet.

Fixedly attaching portions of the unitary sheet to the sealing plate may comprise: providing a frame plate comprising a plurality of apertures; disposing the unitary sheet on one of the sealing plate and the frame plate; disposing the frame plate over the sealing plate such that the unitary sheet is located between the sealing plate and the frame plate, each one of the plurality of apertures of the frame plate being aligned with an associated one of the plurality of ports; and attaching the frame plate to the sealing plate such as to fix the anchor portions relative to the sealing plate.

Attaching the frame plate to the sealing plate may comprise welding, adhesive bonding, heat staking, or mechanical clamping.

Fixedly attaching portions of the unitary sheet to the sealing plate may comprise: providing a frame plate comprising a plurality of apertures; disposing the unitary sheet on one of the sealing plate and the frame plate; disposing the frame plate over the sealing plate such that the unitary sheet is located between the sealing plate and the frame plate, each one of the plurality of apertures of the frame plate being aligned with an associated one of the plurality of ports; providing a retention plate; disposing the retention plate over the frame plate; and attaching the retention plate to the sealing plate such as to fix the frame plate and the anchor portions relative to the sealing plate.

Fixedly attaching portions of the unitary sheet to the sealing plate may comprise: providing a retention plate; disposing the retention plate over the sealing plate such that the unitary sheet is located between the sealing plate and the retention plate; and attaching the retention plate to the sealing plate such as to fix the anchor portions relative to the sealing plate.

Forming the partings or discontinuities in the unitary sheet may comprise cutting the unitary sheet.

Forming the partings or discontinuities in the unitary sheet may comprise removing material from the unitary sheet.

Removing material from the unitary sheet may comprise etching the unitary sheet.

Removing material from the unitary sheet may comprise laser ablating the unitary sheet.

The sealing plate may be constructed from a metal or a metal alloy.

The sealing plate may be constructed from a polymer material.

The unitary sheet may be constructed from a metal or a metal alloy.

The unitary sheet may be constructed from a polymer material.

The unitary sheet may be constructed from a semiconductor material.

Fixedly attaching portions of the unitary sheet to the sealing plate may comprise applying adhesive to at least one of the unitary sheet and the sealing plate.

According to another aspect of the invention, there is provided a valve for controlling a flow of a fluid, the valve comprising: a sealing plate comprising a plurality of ports for passage of the fluid through the sealing plate substantially perpendicularly to the plane of the sealing plate; and a plurality of valve closure members, each valve closure member being in movable relationship with the sealing plate under a differential pressure of the fluid across the valve, the valve closure member being movable away from the sealing plate under a first differential pressure direction to open at least one of the ports and toward the sealing plate under a second and opposite differential pressure direction to close said at least one of the ports, wherein the valve closure members are partitioned from each other such as to define a plurality of valve cells, each valve cell comprising one of the valve closure members and at least one associated port.

In this latter aspect of the invention, the anchor portions are omitted and the closure members are each free to move away from the sealing plate to uncover the ports, and to return to the sealing plate to cover the ports. In the absence of anchor portions, suitable structures may be provided in the valve for constraining lateral movement of the closure members across the face of the sealing plate.

Thus the present invention provides an improved valve having a plurality (e.g. an array) of individual valve cells each capable of movement between an open and a closed position and between valve material failures are unable to propagate.

BRIEF DESCRIPTION OF THE DRAWINGS

The invention will now be described, by way of example, with reference to the accompanying figures in which.

DETAILED DISCUSSION

Figure 1:
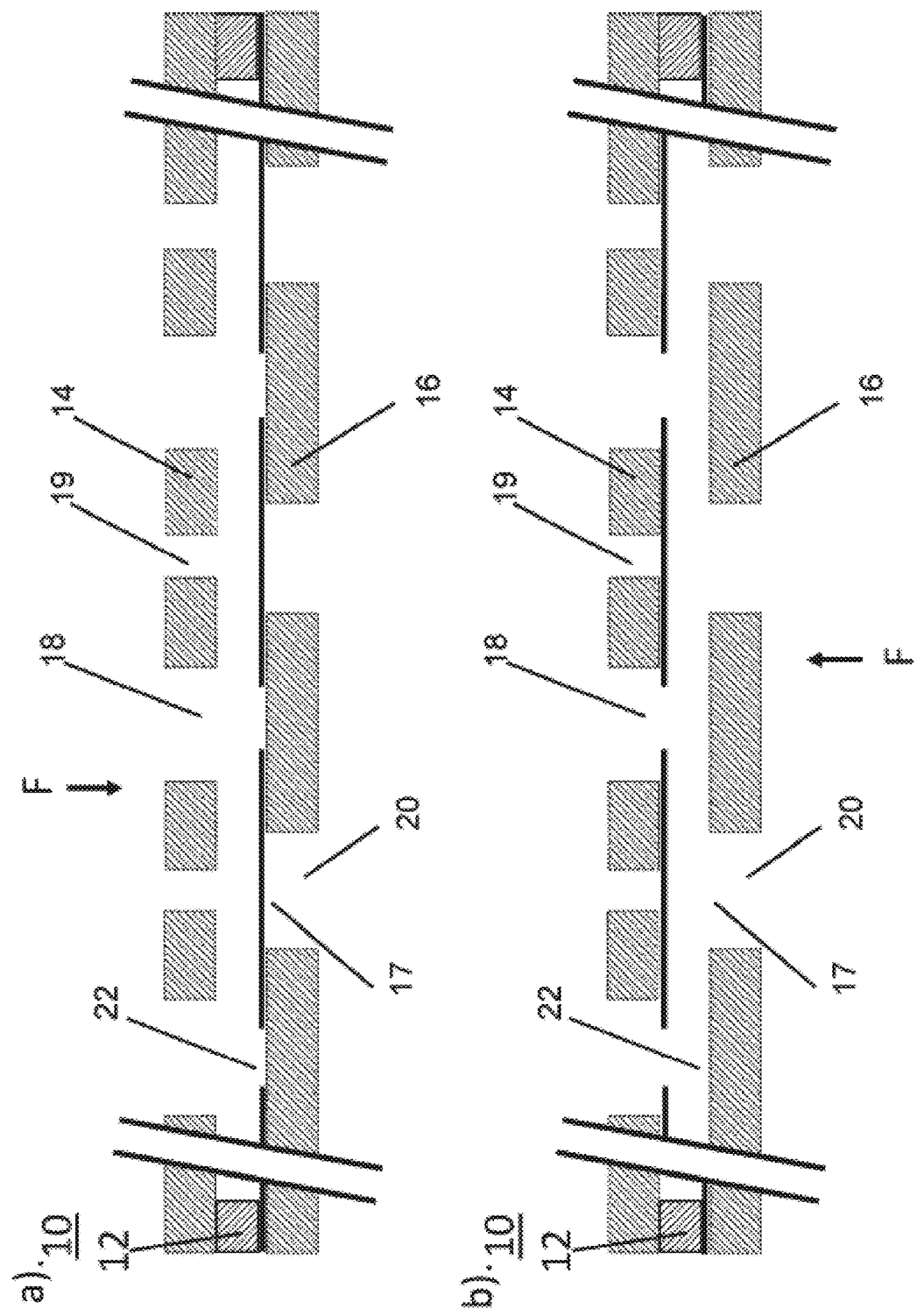
FIG. 1 shows a cross sectional view of a conventional high frequency valve.

FIG. 1 shows a conventional valve 10 which comprises:
Retention Plate 14
Sealing Plate 16
Ring shaped wall ('Shim) 12
Flap 17 (peripheral portion sandwiched between the sealing plate 16 and the ring shaped wall 12 to restrain the motion)
Holes in the Sealing Plate 20

Holes in the Retention Plate 18 substantially misaligned with the holes in the Sealing Plate 20

Release holes in the Retention Plate 19 substantially aligned with the holes in the sealing plate 20

Holes in the Valve flap 22 substantially aligned with the holes in the Retention Plate 18 and substantially misaligned with the holes in the Sealing Plate 20

Such that when:
the force F on the flap 17 due to a pressure difference across the valve 10 is 'downwards' (as shown in FIG. 1a), the hole 20 in the sealing plate 16 is sealed by the valve flap 17 and the valve is substantially 'closed' the force F on the flap 17 due to a pressure difference across the valve 10 is 'upwards' (as shown in FIG. 1b), the flap 17 lifts or stretches away from the hole 20 in the sealing plate 16 and is restrained by the retention plate 14, allowing air to flow through the hole 20 in the sealing plate 16, between the sealing plate 16 and retention plate 14, through the hole 22 in the flap 17 and through the hole 18 in the retention plate 14, providing a valve 10 that is substantially 'open'.

The material of the valve flap experiences high frequency oscillation and may eventually fail due to fatigue. A failure of the valve flap material tends to lead to propagation of a crack or tear across the valve flap.

Figure 2:
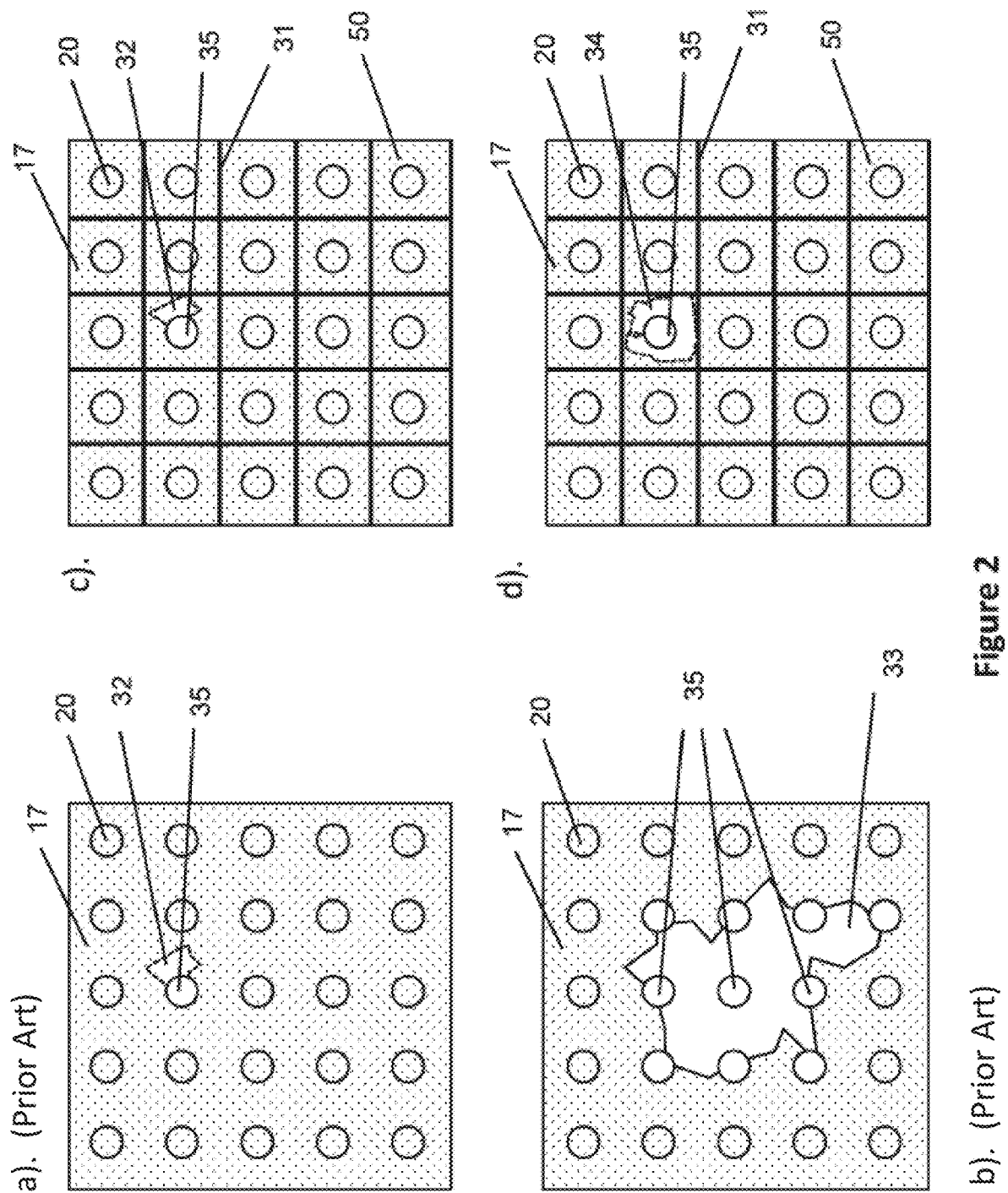
FIGS. 2a and 2b show illustrative examples of how an initial failure in the valve flap of the valve of FIG. 1 may propagate to affect larger areas of the valve flap.
FIGS. 2c and 2d relate to the present invention and show how an initial failure in a valve flap may be constrained by portioning the valve using local anchor points, preventing failure propagation.

FIG. 2 shows two illustrative examples of flap failure propagation.

FIG. 2a shows
A valve flap 17 supported over
an array of holes 20 in the sealing plate (not shown)
with an initial flap failure 32 resulting in
A single uncovered hole 35 in the sealing plate FIG. 2b shows the valve flap 17 some time later after the flap 17 has been further fatigued and shows
An expanded flap failure 33
Multiple uncovered holes 35 in the sealing plate (only 3 labelled).

The expanded flap failure 33 will lead to increased back flow through the valve structure, and reduces the efficiency of the valve.

FIG. 2c relates to the present invention and shows
A valve flap 17 supported over
An array of holes 20 in the sealing plate (not shown)
An arrangement of partition features points 31 distributed between the holes 20 in the sealing plate which forms
An array of valve cells 50 defined by the partition features 31
an initial flap failure 32
a single uncovered hole 35 in the sealing plate FIG. 2d shows the valve flap 17 some time later after the flap 17 of FIG. 2c has been further fatigued and shows
A contained flap failure 34
A single uncovered hole 35 in the sealing plate In this way, the flap failure 34 is prevented from affecting multiple holes 35 in the sealing plate.

Figure 3:
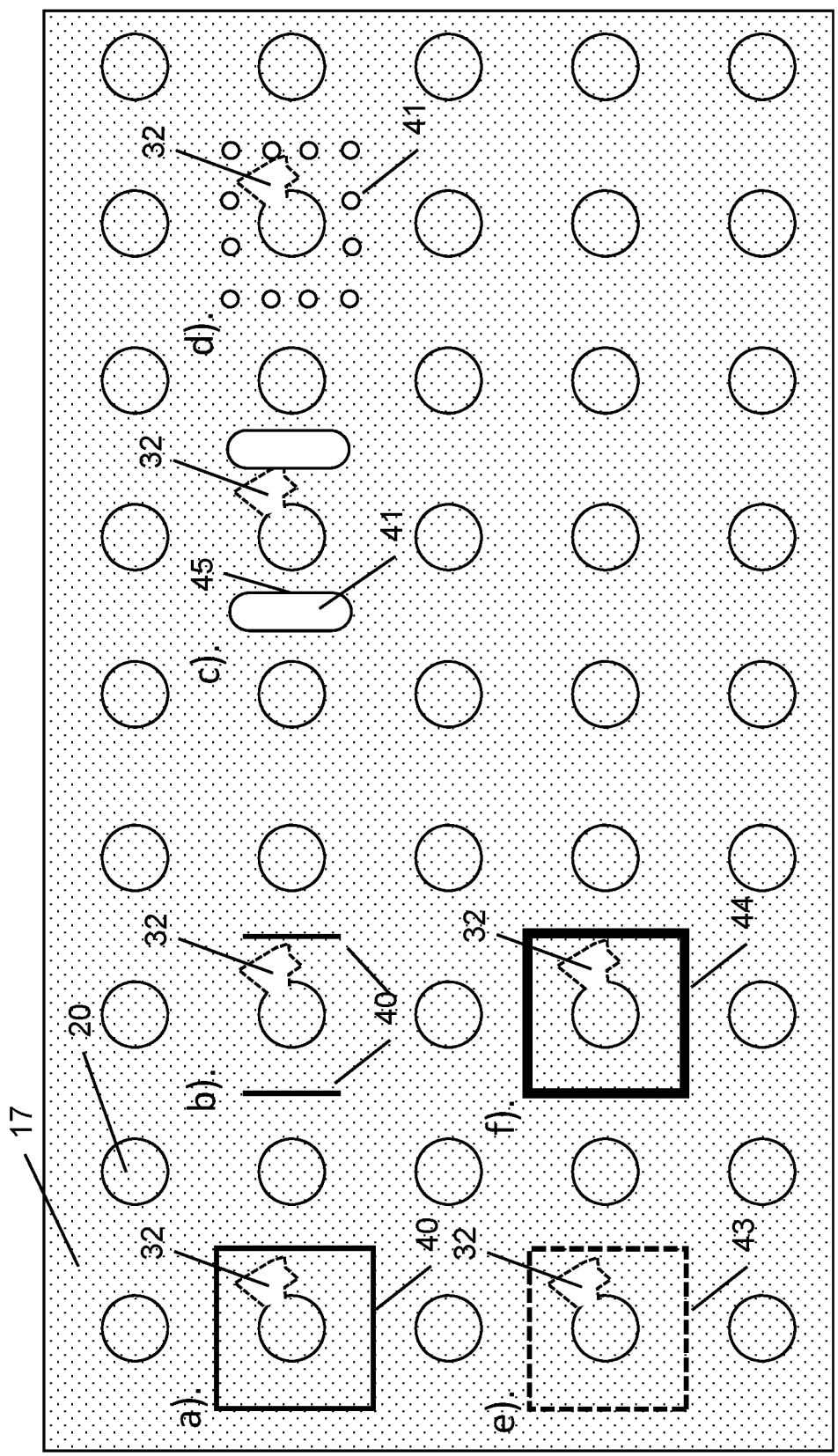
FIGS. 3a-f show examples of different means for partitioning the valve array.

FIG. 3 shows a number of examples of partition features which may be employed to prevent propagation of a flap failure 32. Simple examples are provided in FIG. 3, however alternative designs with different sizes, positions, coverages and combinations of the features illustrated can be readily imagined.

FIGS. 3a and 3b show:
flap anchor lines 40 provided either continuously or selectively around the hole 20 in the sealing plate when the flap 17 is immobilised, preventing propagation of a flap failure 32

Flap anchor lines 40 may be provided by:
Bonding the flap 17 to the sealing plate 16 or another stationary component
Trapping the flap 17 between the sealing plate 16 and another component FIGS. 3c and 3d show:
gaps 41 created in the flap 17, providing free edges 45 of the flap providing crack termination sites and preventing flap failure propagation through these regions, or providing termination points to halt the failure propagation These gaps may be created by
Laser ablation
Mechanical cutting FIG. 3e shows:
lines of weakness 43 provided in the flap 17 which may be used to direct and contain the failure propagation These lines of weakness may be created by:
Laser ablation to thin the material or add perforations
Mechanical cutting
Etching (e.g. reactive ion etching)

FIG. 3f shows:
areas of reinforced flap 44 which may be used to halt propagation of a flap failure.

These lines of reinforced flap may be created by
Bonding additional parts to the valve flap
Laser ablation to thin the rest of the flap from a thicker material
Deposition or growth of material onto the flap The use of a local anchor feature holding the flap 17 to the sealing plate 16 in the vicinity of the holes 20 can be used as a method of restraining the flap 17 motion without the need for a conventional retention plate. This 'two elements' design (i.e. sealing plate+flap) can provide benefits over the 'three element design' (i.e. sealing plate, flap and retention plate) including:
simplified manufacture
a simplified flow path, resulting in reduced flow restriction through the valve in the open direction
increased flap response speed of the flap due to increased interaction between the pressure driving the valve and the flap 17

FIGS. 4a-c, 5a-c, 6a-c, 7a-c and 8a-f show examples of 'two element' structures for an individual 'valve cell' utilising a combination of the anchor lines and free edges described in FIGS. 3a-f.

Figure 4:
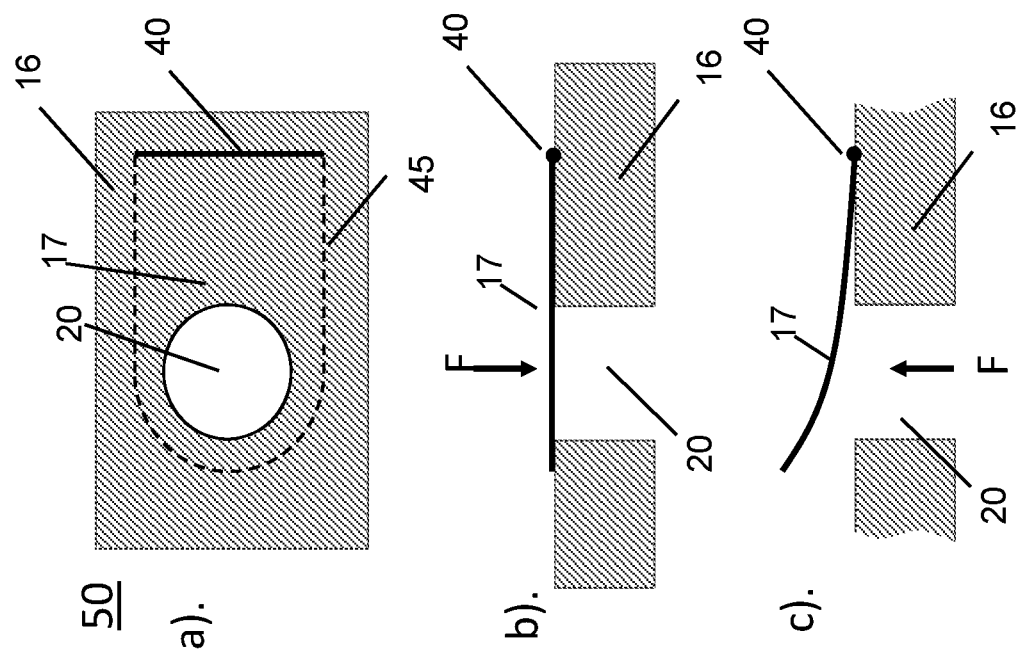
FIGS. 4a-c, 5a-c, 6a-c and 7a-c show plan views of examples of valve cells.

FIGS. 4a-c show one example of a valve cell 50 in which:
The valve flap 17 is enclosed by a straight anchor line 40 and a free edge
The anchor line joins the valve flap 17 to the sealing plate 16
The valve flap 17 covers a hole 20 in the sealing plate 16 and is held in position in the plane of the sealing plate 16 by the anchor line 40
The flap 17 has sufficient flexibility to allow it to move in the direction perpendicular to the plane of the sealing plate 16
The flap 17 has sufficient rigidity to prevent the flap 17 from moving too far from the sealing plate 16, providing fast response time Such that when:
the force F on the flap 17 due to a pressure difference across the valve cell 50 is downwards (as shown in FIG. 4b, which shows a section through line X of the valve cell 50), the hole 20 in the sealing plate 16 is sealed by the valve flap 17 and the valve cell 50 is substantially 'closed' the force F on the flap 17 due to a pressure difference across the valve cell 50 is upwards (as shown in FIG. 4c, which shows a section through line X of the valve cell 50), the flap 17 bends away from the hole 20 in the sealing plate 16, allowing air to flow through the hole 20 in the sealing plate 16 and around the free edge 45 of the flap 17 and providing a valve cell 50 that is substantially 'open'

Any failure of the flap 17 will be constrained by the free edge 45 or the anchor line 40, and be unable to propagate to adjacent valve cells.

The flap 17 may alternatively be made entirely rigid (non-bendable), such that it will simply pivot about the anchor line in order to open and close the hole 20.

Figure 5:
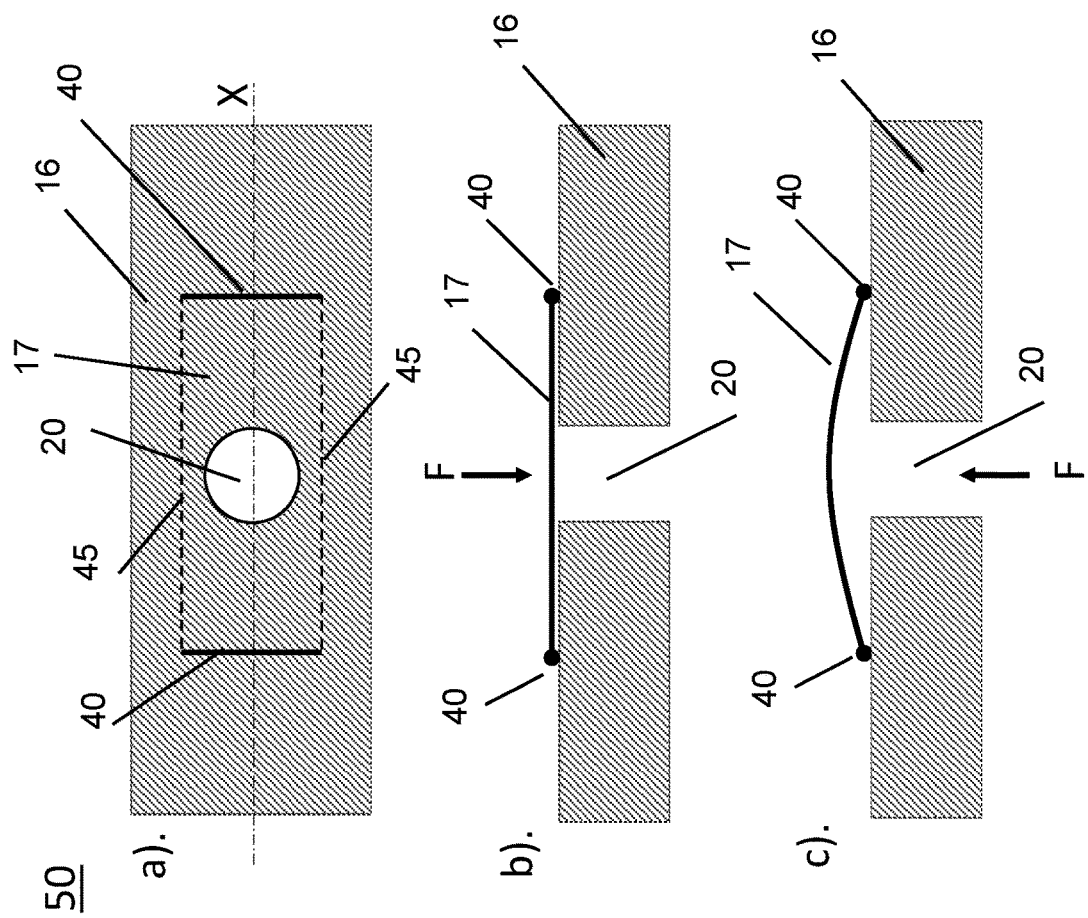

FIGS. 5a-c show another example of a valve cell 50 in which:

The valve flap 17 is enclosed by two straight anchor lines 40 and two free edges 45

The anchor lines join the valve flap 17 to the sealing plate 16

The flap 17 covers a hole 20 in the sealing plate 16 and is held in position in the plane of the sealing plate 16 by the anchor lines 40

The flap 17 is elastically deformable and is sufficiently flexible or stretchable to allow it to move in the direction perpendicular to the plane of the sealing plate 16

The flap 17 has sufficient tension to prevent the flap 17 from moving too far from the sealing plate 16, providing fast response time Such that when:

the force F on the flap 17 due to a pressure difference across the valve cell 50 is downwards (as shown in FIG. 5b, which shows a section through line X of the valve cell 50), the hole 20 in the sealing plate 16 is sealed by the valve flap 17 and the valve cell 50 is substantially 'closed' the force F on the flap 17 due to a pressure difference across the valve cell 50 is upwards (as shown in FIG. 5c, which shows a section through line X of the valve cell 50), the flap 17 stretches (bends) away from the hole 20 in the sealing plate 16, allowing air to flow through the hole 20 in the sealing plate 16 and around the free edge 45 of the flap 17 and providing a valve cell 50 that is substantially 'open'

Any failure of the flap 17 will be constrained by the free edges 45 or the anchor lines 40, and be unable to propagate to adjacent valve cells.

Figure 6:
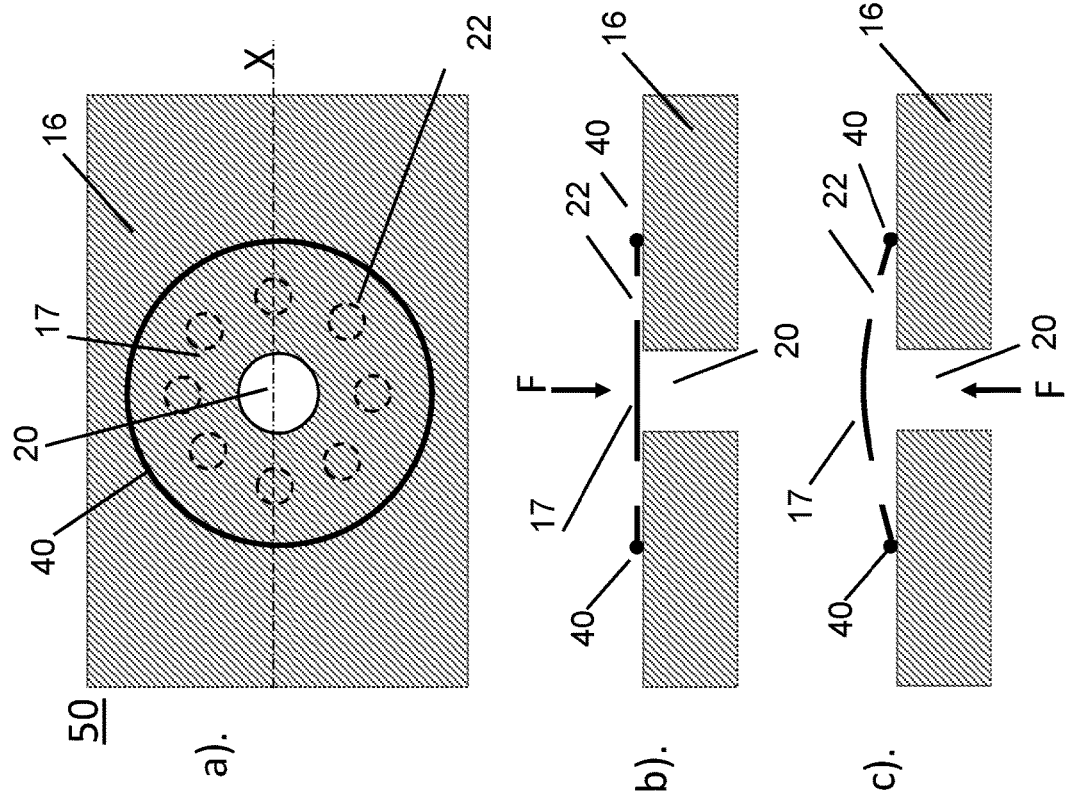

FIGS. 6a-c show another example of a valve cell 50 in which:

The valve flap 17 is enclosed by a circular anchor line 40

The anchor line joins the valve flap 17 to the sealing plate 16

The flap 17 covers a hole 20 in the sealing plate 16 and is held in position in the plane of the sealing plate 16 by the anchor line 40

Holes 22 are provided in the flap 17 which are substantially misaligned form the sealing hole 20

The flap 17 is elastically deformable and is sufficiently flexible or stretchable to allow it to move in the direction perpendicular to the plane of the sealing plate 16

The flap 17 has sufficient tension to prevent the flap 17 from moving too far from the sealing plate 16, providing fast response time Such that when:

the force F on the flap 17 due to a pressure difference across the valve cell 50 is downwards (as shown in FIG. 6b, which shows a section through line X of the valve cell 50), the hole 20 in the sealing plate 16 is sealed by the valve flap 17 and the valve cell 50 is substantially 'closed' the force F on the flap 17 due to a pressure difference across the valve cell 50 is upwards (as shown in FIG. 5c, which shows a section through line X of the valve cell 50), the flap 17 stretches (bends) away from the hole 20 in the sealing plate 16, allowing air to flow through the hole 20 in the sealing plate 16, through the gap between the flap 17 and the sealing plate 16 and through the holes 22 in the flap 17, providing a valve cell 50 that is substantially 'open'

Figure 7:
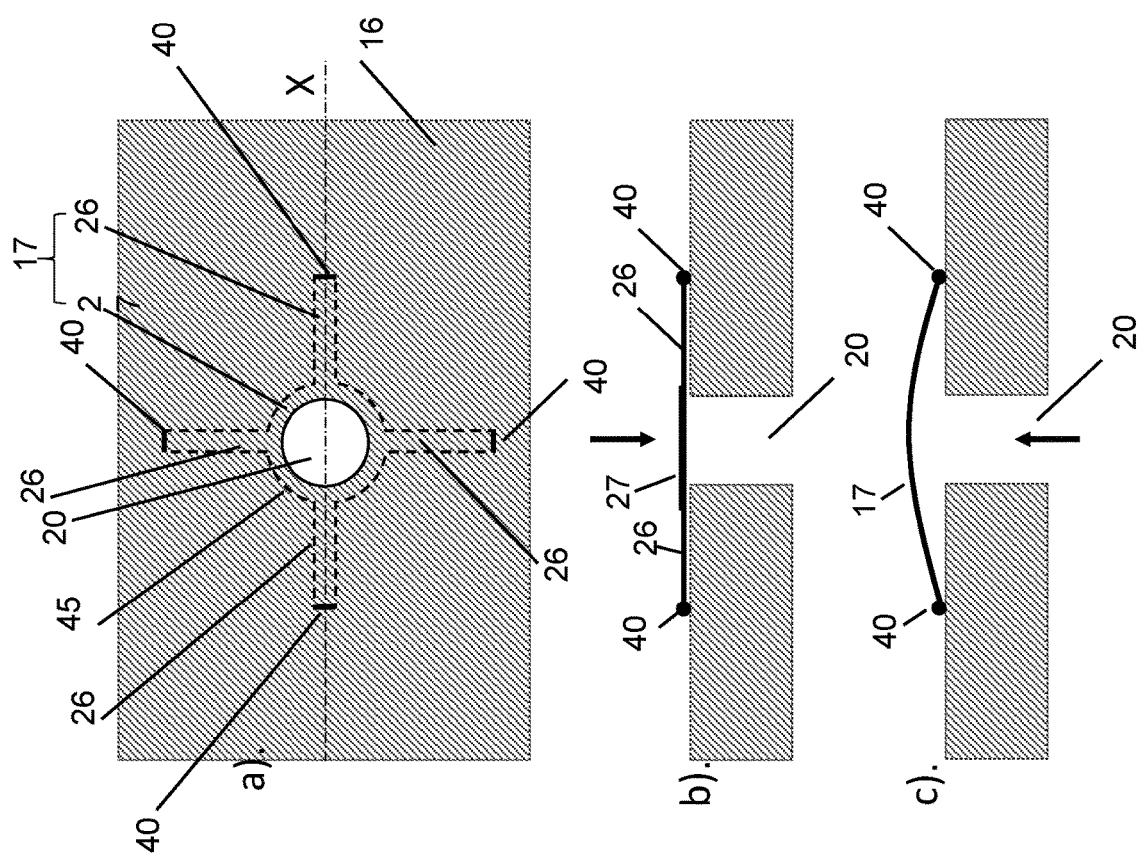

Any failure of the flap 17 will be constrained by the anchor line 40, and be unable to propagate to adjacent valve cells FIGS. 7a-c show another example of a valve cell 50 in which:

The valve flap 17 consists of a central covering section 27 which covers a hole 20 in the sealing plate 16 and four flap support sections 26 protruding away from the sealing hole Each flap support 26 has an anchor line 40 at the end furthest from the covering section 2, and two free edges 45

The anchor lines join the valve flap 17 to the sealing plate 16

The flap 17 covers a hole 20 in the sealing plate 16 and is held in position in the plane of the sealing plate 16 by the anchor lines 40

The flap 17 is elastically deformable and is sufficiently flexible or stretchable to allow it to move in the direction perpendicular to the plane of the sealing plate 16

The flap 17 has sufficient tension to prevent the flap 17 from moving too far from the sealing plate 16, providing fast response time The flap supports 26 can be designed to provide the correct balance between flexibility and rigidity to achieve the desired valve flap response Such that when:

the force F on the flap 17 due to a pressure difference across the valve cell 50 is downwards (as shown in FIG. 7b, which shows a section through line X of the valve cell 50), the hole 20 in the sealing plate 16 is sealed by the covering portion 27 of the flap 17 and the valve cell 50 is substantially 'closed' the force F on the flap 17 due to a pressure difference across the valve cell 50 is upwards (as shown in FIG. 7c, which shows a section through line X of the valve cell 50), the covering portion 27 of the flap 17 stretches (bends) away from the hole 20 in the sealing plate 16, allowing air to flow through the hole 20 in the sealing plate 16 and around the free edge 45 of the flap 17 and providing a valve cell 50 that is substantially 'open'

Any failure of the flap 17 will be constrained by the free edges 45 or the anchor lines 40, and be unable to propagate to adjacent valve cells.

FIGS. 8a-c and 8d-f show two variants on the example shown in FIGS. 6a-c.

Figure 8:
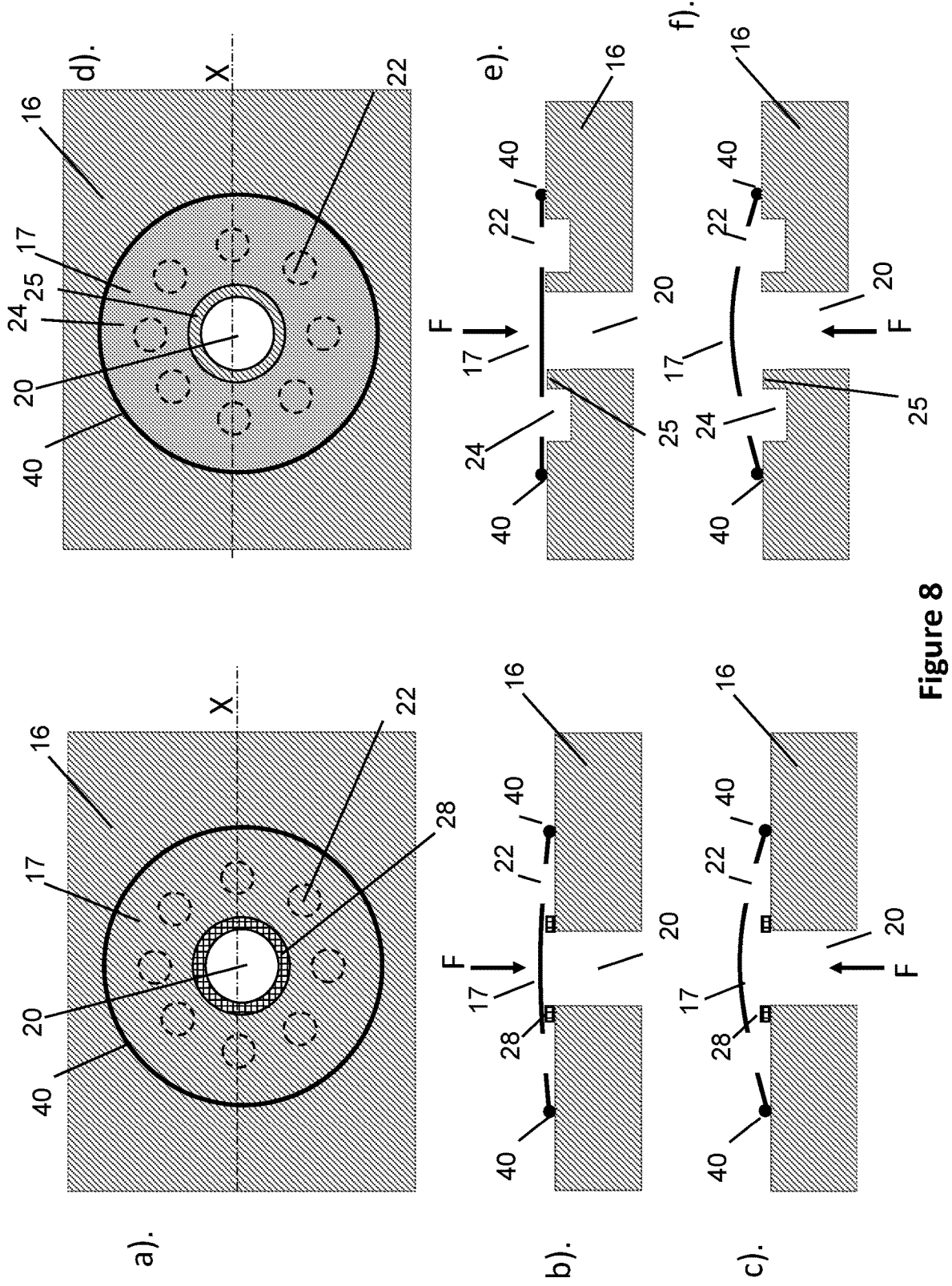
FIGS. 8a-c and 8d-f show features which may be included in a valve cell.

In FIGS. 8a-c:
The valve flap 17 is enclosed by a circular anchor line 40
The anchor line joins the valve flap 17 to the sealing plate 16
The flap 17 covers a hole 20 in the sealing plate 16 and is held in position in the plane of the sealing plate 16 by the anchor line 40
Holes 22 are provided in the flap 17 which are substantially misaligned form the sealing hole 20
The flap 17 is elastically deformable and is sufficiently flexible or stretchable to allow it to move in the direction perpendicular to the plane of the sealing plate 16
The flap 17 has sufficient tension to prevent the flap 17 from moving too far from the sealing plate 16, providing fast response time
A raised sealing edge 28 is provided close to the perimeter of the hole 20 in the sealing plate 16 which provides:
    protection to the flap 17
    improvement to the sealing when the flap 17 is pressed against the raised sealing edge 28
In FIGS. 8d-f:
The valve flap 17 is enclosed by a circular anchor line 40
The anchor line joins the valve flap 17 to the sealing plate 16
The flap 17 covers a hole 20 in the sealing plate 16 and is held in position in the plane of the sealing plate 16 by the anchor line 40
Holes 22 are provided in the flap 17 which are substantially misaligned form the sealing hole 20
The flap 17 is elastically deformable and is sufficiently flexible or stretchable to allow it to move in the direction perpendicular to the plane of the sealing plate 16
The flap 17 has sufficient tension to prevent the flap 17 from moving too far from the sealing plate 16, providing fast response time
A recess 24 in the sealing plate 16 and a sealing edge 25 is provided close to the perimeter of the hole 20 in the sealing plate 16 which provides:
    Reduced flow restriction as air flows radially outwards from the hole 20 in the sealing plate 16 and holes 22 in the flap 17

A range of materials may be used for the valve flap of each of the above-described valves. These include, but are not limited to, metals or metal alloys, polymers, and semiconductor materials.

A difference between the present invention and the prior art is the increased vertical constraint of the valve flap resulting from anchor lines located close to the sealing holes.

Figure 15:
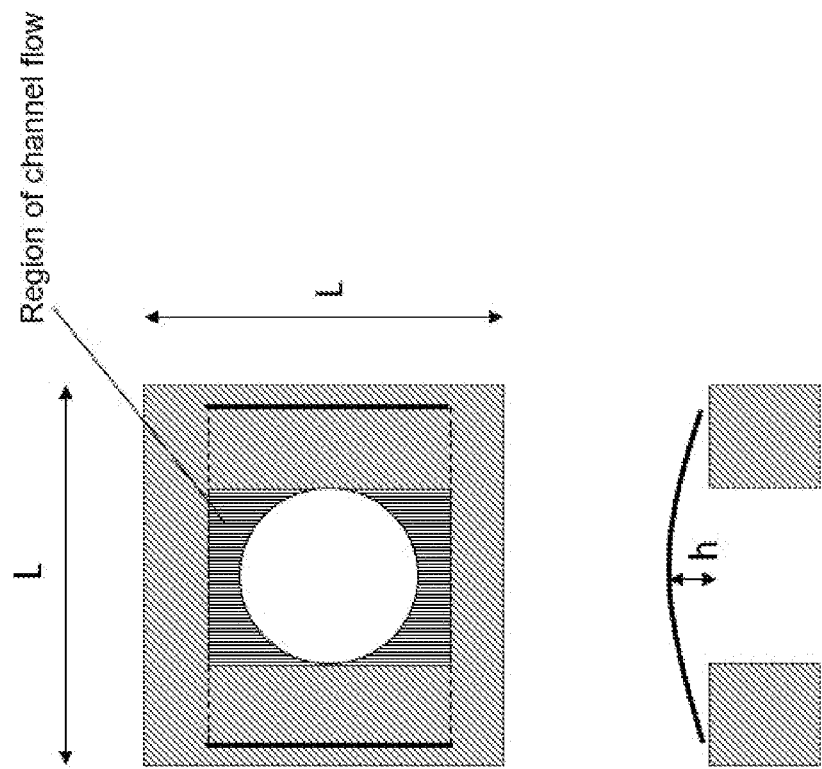
FIG. 15 relates to a design rationale for a valve cell.
Figure 15:
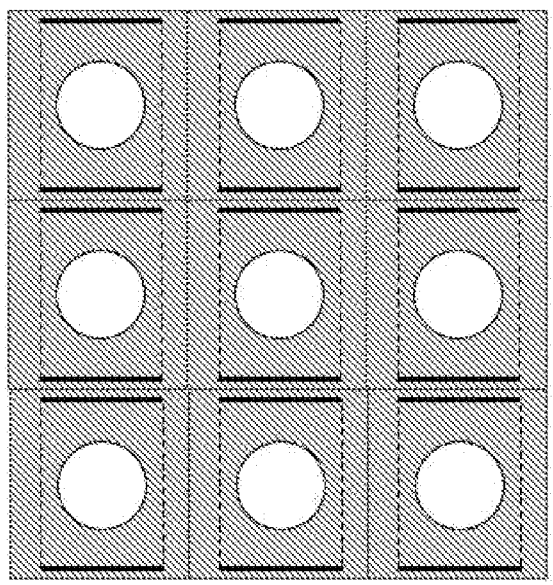

Referring to FIG. 15, three conflicting requirements drive the detailed design of the structure:

1) As with the prior art, the valve is intended to be driven at high frequencies, putting a requirement on the valve flap mass per unit area. This requirement, relates the required vertical displacement h, applied pressure P and oscillation frequency f, to material properties density ρ and thickness δ as follows:

$$\delta \rho = \frac{P}{2h} \frac{1}{16 f^2}$$

2) The second constraint is that when in the open position, the flow conductance (flow per unit pressure) for a given valve should be maximised. In the acoustic resonance pump, the area available with high pressure close to the antinode of the pressure is limited, and so it is desirable to maximise the flow conductance per unit area of the valve.

For an array of square unit cells as may be provided by the present invention, and approximating the flow conductance as plane Poiseuille flow between the sealing plate and the valve flap as the flow emerges laterally from the sealing hole, this constraint can be parametrised as:

$$\frac{\sigma}{A} \propto \frac{\frac{Lh^3}{\mu d}}{L^2} \propto \frac{h^3}{\mu dL}$$

Where σ is the flow conductance (flow per unit pressure), L is the unit cell width, h the height of the valve flap from the sealing plate when the valve is open, μ the dynamic viscosity of air and d is the length of the channel. In practise d is constrained by the assembly tolerances of the structure (how much the valve flap overlaps the sealing hole), and so this constraint drives the design to small unit cells. In practise the minimum cell size will be determined by fabrication tolerances. As an example, if the sealing plate is fabricated by electrochemical etching, the hole size should be >1.2× material thickness, although other processes such as MEMs fabrication and laser machining may allow smaller unit cells to be fabricated 3) The final constraint is that there is little distance between the anchor lines (where the valve flap is immobilised) and the sealing holes (where the valve flap is required to stretch or pivot away from the sealing plate. Examination of the valve flap as a beam simply supported at both ends and distorted by distance h under applied pressure P) the third constraint is expressed as:

$$h \propto \frac{PL^4(1-v)}{E\delta^3}$$

where L is the cell length, P the pressure, δ the valve flap thickness, E the Youngs Modulus of the valve flap material and v the Poisson's ratio of the valve flap material.

For a given material, these three constraints define a preferred design geometry for the present invention, as follows:
    E<50 GPa
    δ<50 um, preferably <10 um
    ρ<3000 kg/m³ more preferably <1500 kg/m³
    h<100 um, preferably <50 um
    L<1000 um, preferably <500 um Methods of making valves according to the invention will now be described.

Figure 9:
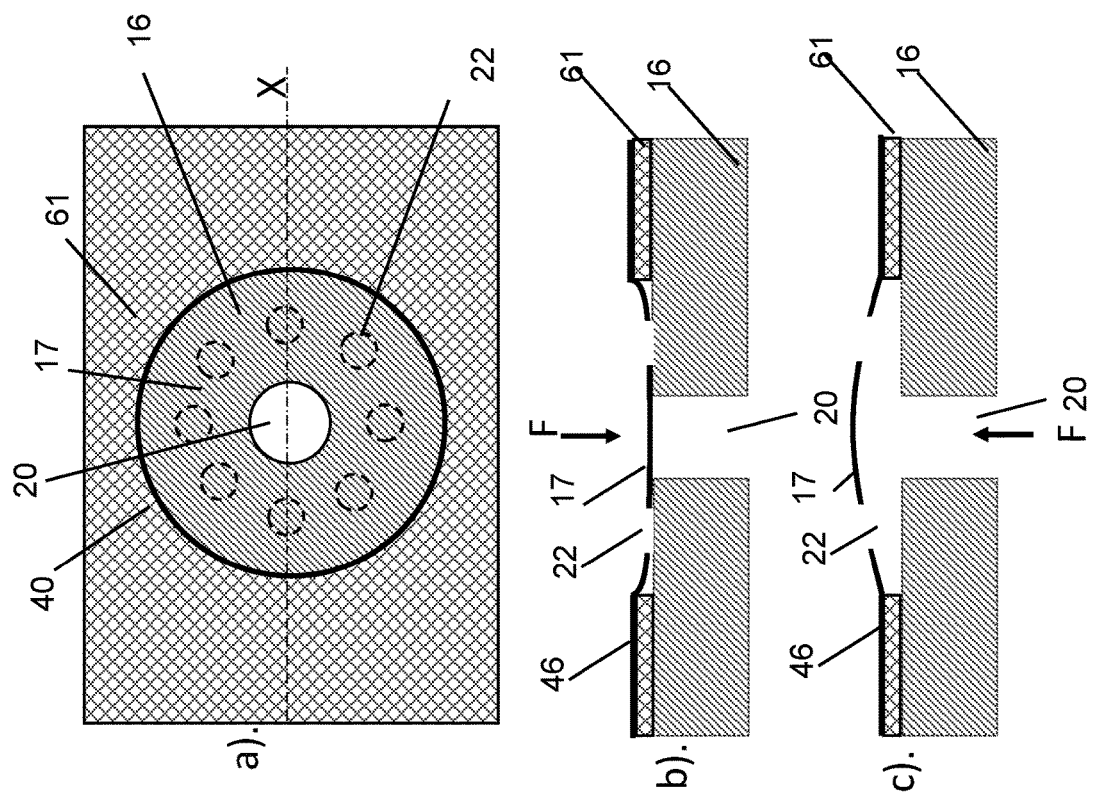
FIGS. 9a-c show an example of a valve cell.

FIG. 9 relates to the valve cell 50 illustrated in FIGS. 6a-c. One example method of construction is as follows:
    A sealing plate 16 with a hole 20
    A layer of pressure sensitive adhesive (PSA) 61 selectively applied onto the sealing plate 16 in regions away from the hole 20, and either absent or removed in the region close to the hole 20
    A flap applied to the PSA 61 across the entire valve cell 50
    Holes 22 laser machined in the flap 17 in the region absent of the PSA and substantially misaligned with the hole 20 in the sealing plate 16

This structure provides
- A region area where the flap 17 is immobilized 46 due to the adhesion to the PSA 61, the edge of this region provides the anchor line 40
- A region of flap 17 which is significantly constrained in the plane of the surface of the sealing plate 16 and free to move in the direction perpendicular to the surface of the sealing plate 16

Figure 10:
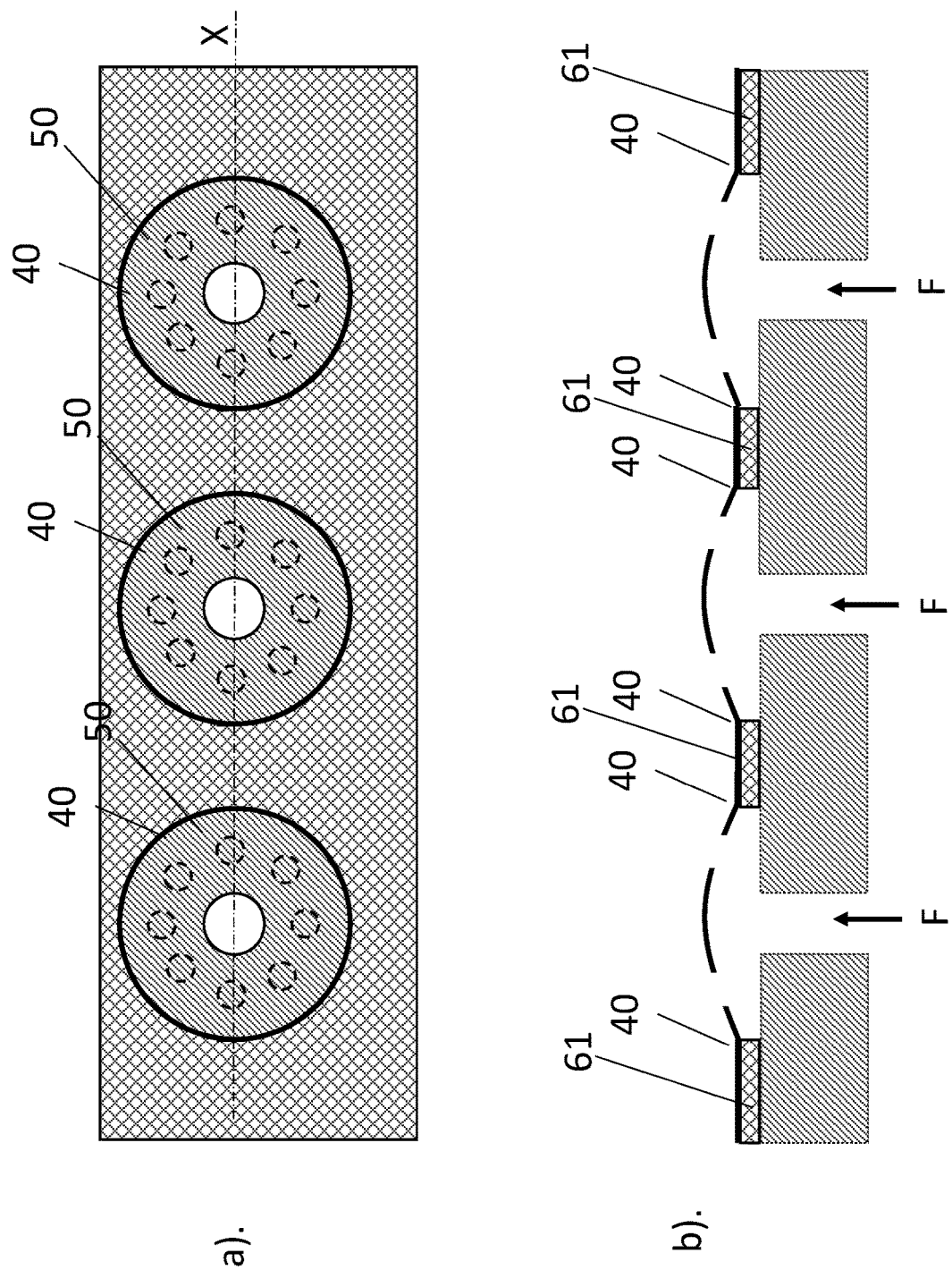
FIGS. 10a and 10b show a plurality of the valve cells of FIGS. 9a-c.

The sealing plate may be fabricated by any of the following methods and materials
- Chemically etched, machined, laser cut, reactive ion etched
- Metal, polymer, semiconductor The PSA may be selectively applier or removed by any of the following methods
- Converted transfer tape, laser ablation, masking The valve flap may be formed from any of the following materials:
- Metal, polymer, semiconductor FIGS. 10a-b show a plurality of the valve cells 50 of FIGS. 9a-c, and show how each valve cell is isolated form the others by the anchor points 40 provided by the PSA 61

FIGS. 11a-c relate to the valve cell 50 illustrated in FIGS. 6a-c. One example method of construction is as follows:
- A sealing plate 16 with a hole 20
- A flap 17 applied to the sealing plate 16 across the entire valve cell 50
- A frame plate 62 with windows 63 in the regions of the holes 20 in the sealing plate 16, placed over the flap 17 and held against the sealing plate 16, trapping the flap 17 in the regions away from the hole 20
- Holes 22 laser machined in the flap 17 in the region exposed by the frame plate 62 and substantially misaligned with the hole 20 in the sealing plate 16

This structure provides
- A region where the flap 17 is immobilized 46 by being trapped between the sealing plate 16 and the frame plate 62, the edge of this region provides the anchor line 40
- A region of flap 17 which is significantly constrained in the plane of the surface of the sealing plate 16 and free to move in the direction perpendicular to the surface of the sealing plate 16

Figure 12:
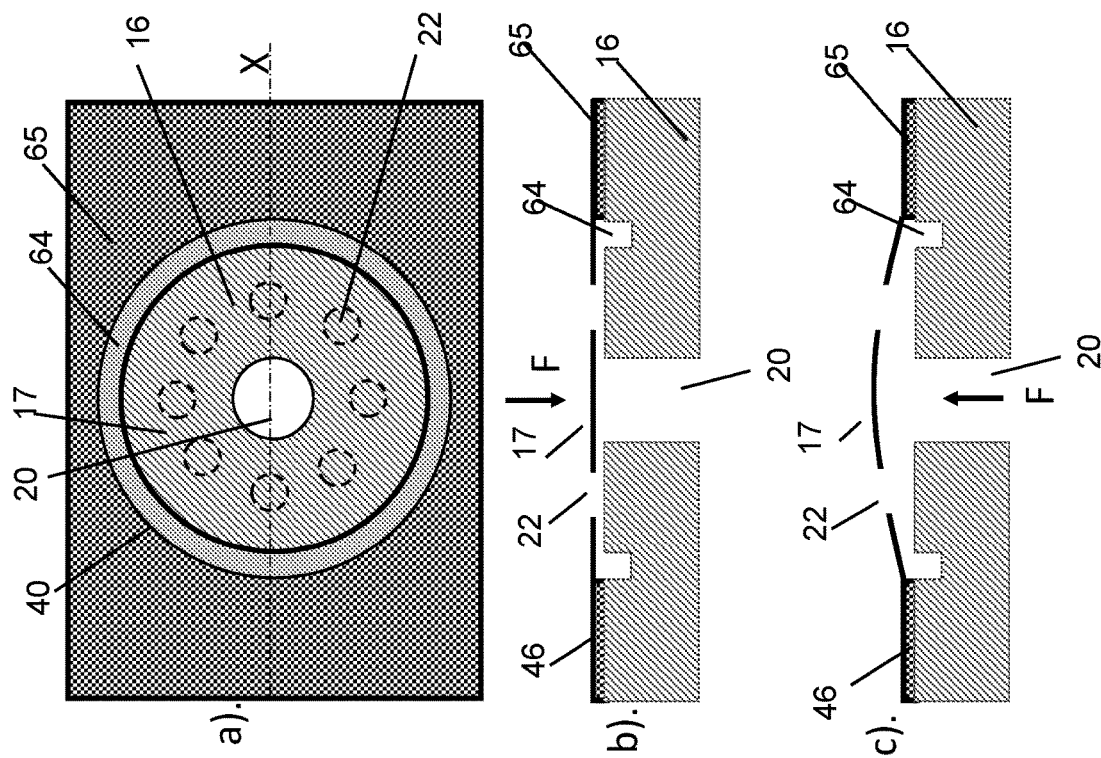

The sealing plate 16 and frame plate 62 may be fabricated by any of the following methods and materials
- Chemically etched, machined, laser cut, reactive ion etched, electroformed
- Metal, polymer, semiconductor The valve flap may be formed from any of the following materials:
- Metal, polymer, semiconductor The sealing plate 16 and frame plate 62 may be held together by any of the following methods
- Welding (e.g. resistance, laser, ultrasonic, solvent)
- Mechanical clamping
- Heat staking
- Bonding using adhesives FIGS. 12a-c relate to the valve cell 50 illustrated in FIGS. 6a-c. One example method of construction is as follows:
- A sealing plate 16 with a hole 20 and glue retention features 64
- A layer of adhesive 65 selectively applied onto the sealing plate 16 in regions away from the hole 20, and absent in the region close to the hole 20
- A flap applied to the adhesive 65 across the entire valve cell 50
- Holes 22 laser machined in the flap 17 in the region absent of the adhesive 65 and substantially misaligned with the hole 20 in the sealing plate 16

This structure provides
- A region area where the flap 17 is immobilized 46 due to the adhesion to the adhesive 65, the edge of this region provides the anchor line 40
- A region of flap 17 which is significantly constrained in the plane of the surface of the sealing plate 16 and free to move in the direction perpendicular to the surface of the sealing plate 16

The sealing plate may be fabricated by any of the following methods and materials
- Chemically etched, machined, laser cut, reactive ion etched, electroformed
- Metal, polymer, semiconductor The adhesive retention features 64 may be any of the following:
- Negative relief features formed by part etching, machining or other removal processes
- Positive relief features formed by an additive manufacturing process including printing, electroforming
- Textured or chemically modified surfaces created by for example part etching, laser cleaning, plasma cleaning The valve flap may be formed from any of the following materials:
- Metal, polymer, semiconductor While a separate and distinct valve flap 17 may be applied to each individual hole 20 of the sealing plate 16, this may be a rather labour-intensive process. A more efficient way to make the valve may be to provide a unitary valve flap sheet which is laid upon the sealing plate 16 such as to cover all of the holes 20, then to fixedly attach (e.g. bond using adhesive) portions of the sheet to the sealing plate 16 in proximity to the holes, in order to define the anchor lines. Partings or discontinuities may then be formed in the sheet (e.g. by cutting, perforating, etching, or the like) in order to define closure portions (i.e. "local" valve flaps) of the sheet at each one of the holes.

Whilst a 'two element' design may have benefits over the conventional 'three element' design, 'three element' designs with partition features can be created.

Figure 11:
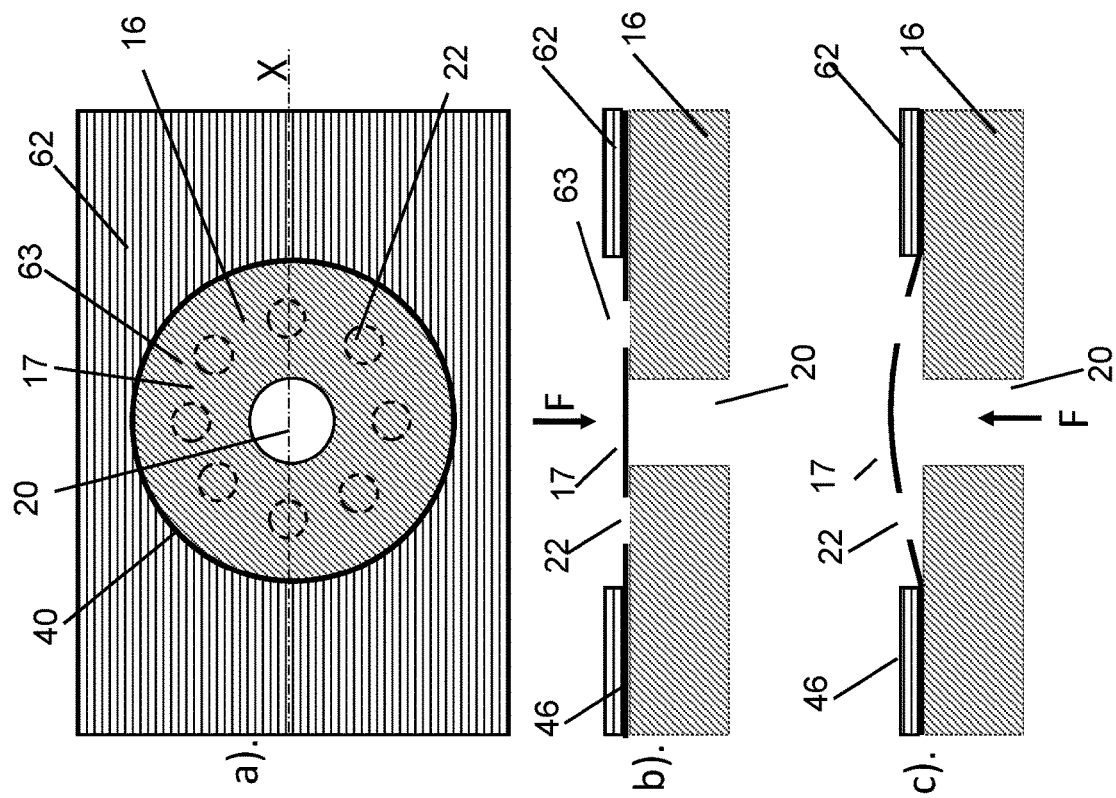
FIGS. 11a-c and 12a-c show other examples of a valve cell.
Figure 13:
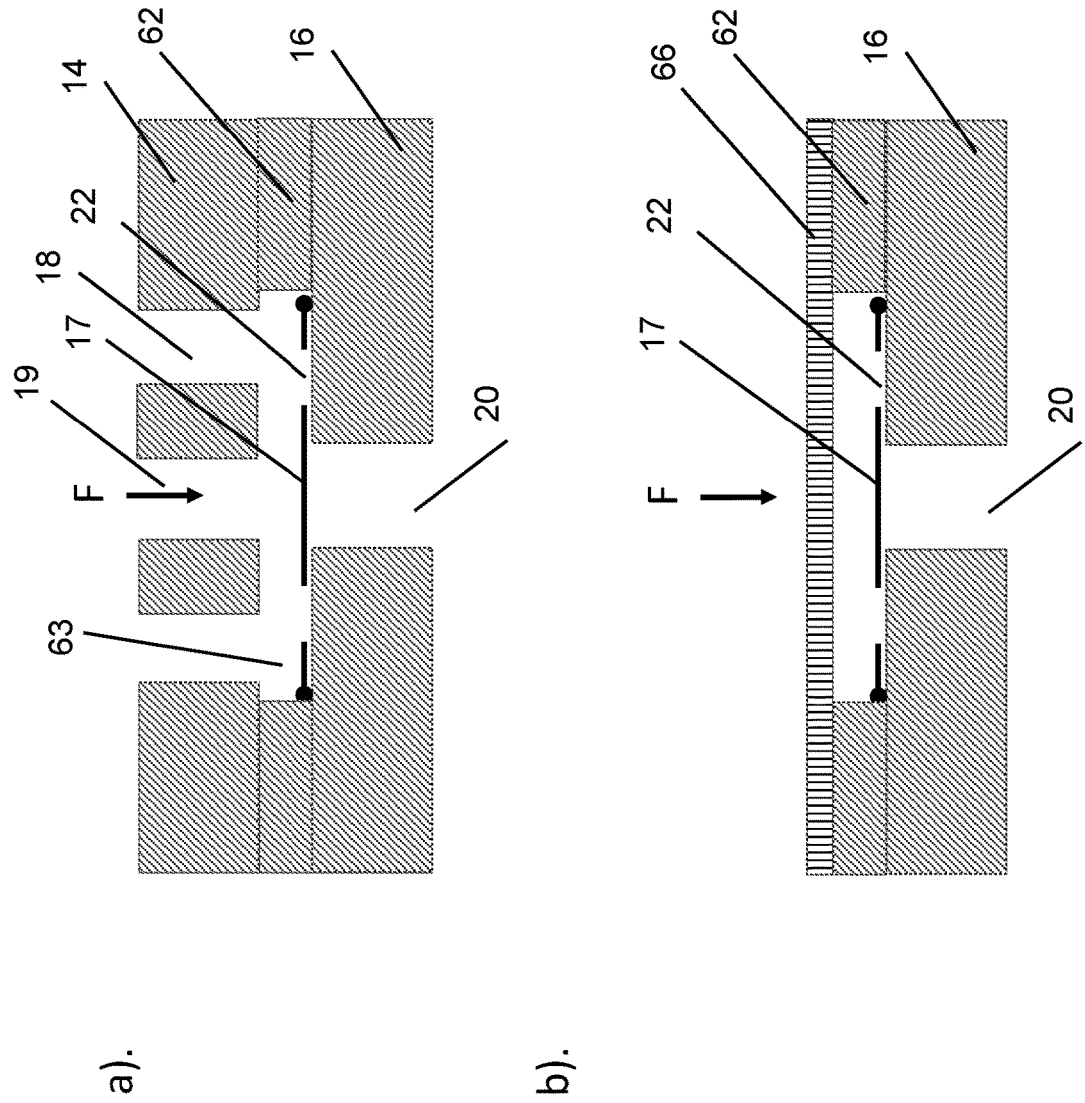
FIG. 13 shows an example of a valve cell with a retention plate.

FIGS. 13a-b show two examples of how the example of FIG. 11 could be extended to provide a retention plate 14.

FIG. 13a shows:
- A sealing plate 16 with a hole 20
- A flap 17 applied to the sealing plate 16 across the entire valve cell 50
- A frame plate 62 with windows 63 in the regions of the holes 20 in the sealing plate 16, placed over the flap 17 and held against the sealing plate 16, trapping the flap 17 in the regions away from the hole 20
- Holes 22 laser machined in the flap 17 in the region exposed by the frame plate 62 and substantially misaligned with the hole 20 in the sealing plate 16
- A retention plate 14 with
  - holes 18 substantially aligned with the holes 22 in the flap 17 and
  - release holes 19
  which constrains the motion of the flap 17

FIG. 13b shows a similar structure, but the retention plate 14 is replaced with a porous retention plate 66 which has a porous structure at all locations. The porous retention plate 66 may be formed form a filter
a wire mesh
a plate with a high density of small holes A retention plate or porous retention plate may be added to any of the previous examples and combined with any of the partition features previously described.

Figure 14:
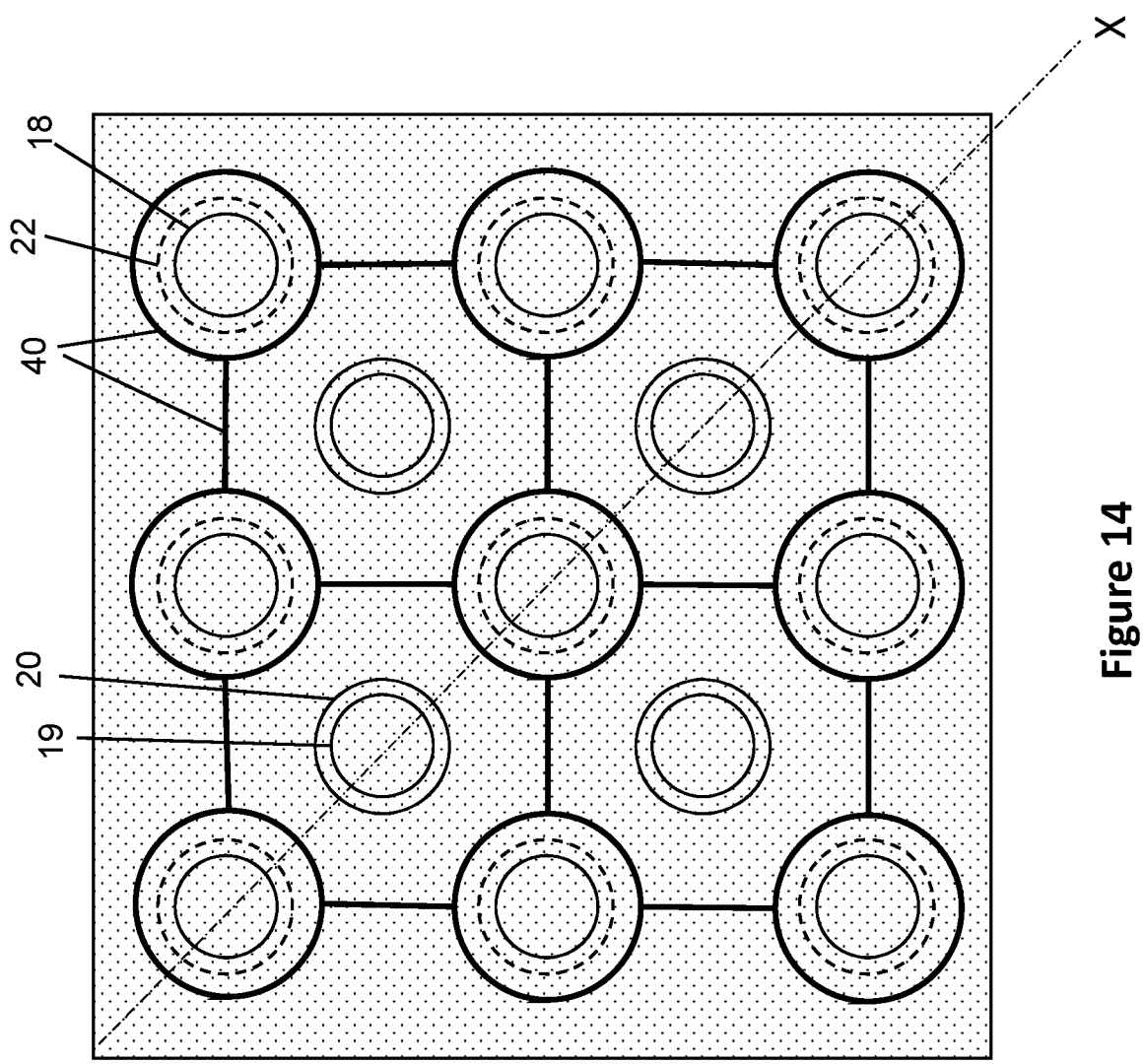
FIGS. 14a-c show an approach to applying partition features to a conventional valve.
Figure 14:
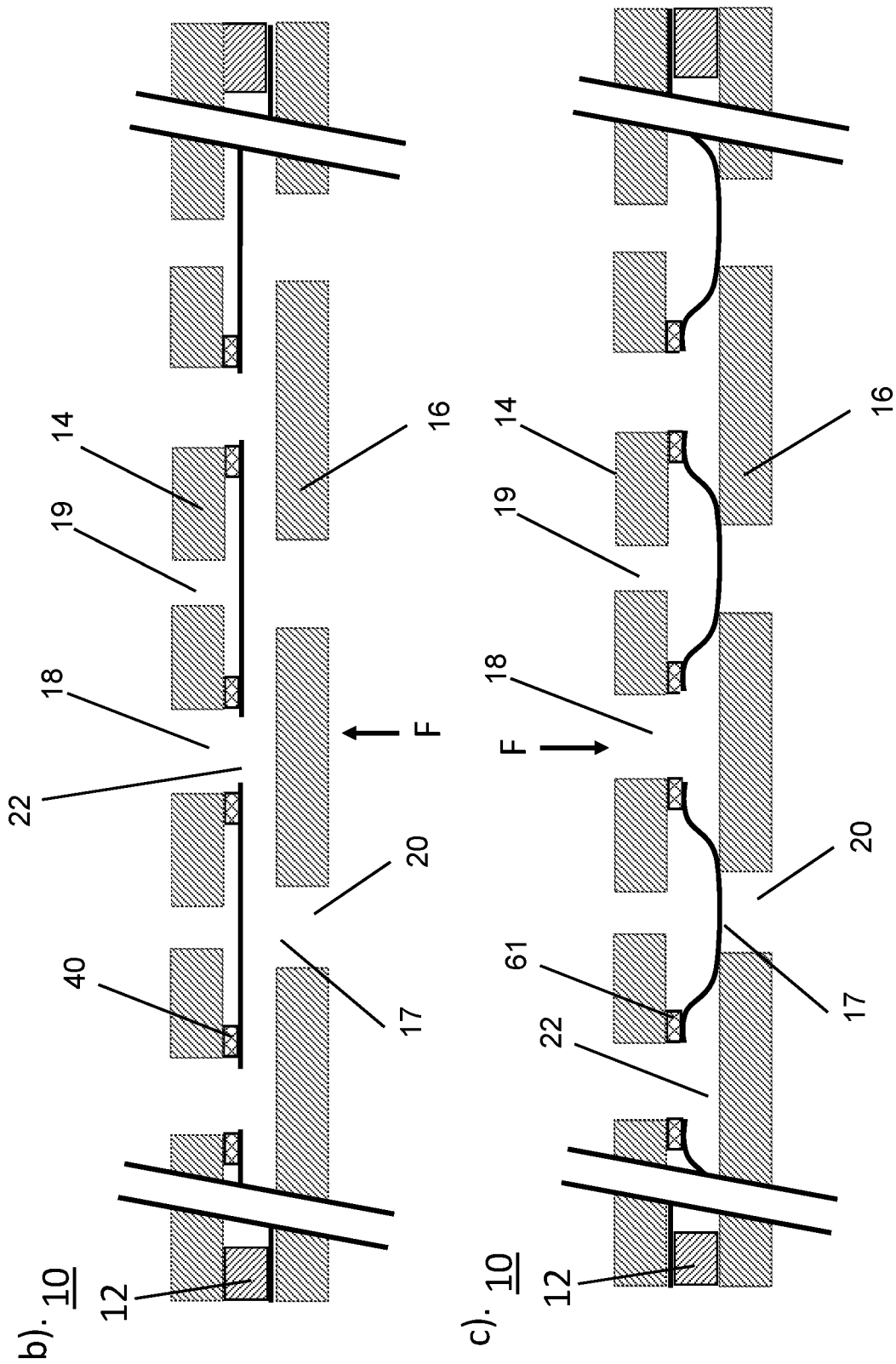

FIG. 14 shows one example of how a partition feature may be combined with a conventional valve structure.

FIG. 14a shows a plan view of the relative positions of
Holes 20 in the sealing plate 16
Holes 18 in the retention plate 14
Release holes 19 in the retention plate
Holes 22 in the valve flap
Anchor lines 40 joining the flap 17 to the retention plate 14 which act as partition features to isolate the individual valve cells FIGS. 14b and 14c show the same items as a cross-section through line X in FIG. 14a when the pressure differential across the valve is positive or negative.

Methods of providing anchor lines within the 'three element' valve structure include but are not limited to:
Adhesive or pressure sensitive adhesive or other methods of bonding
Mechanical clamping by
Additional component (e.g. a frame plate as disclosed earlier in this document)
Protrusions on any of the plates to locally clamp the flap 17
Alternatively any of the other partition features disclosed herein may be applied.

It will be understood that the invention has been described in relation to its preferred examples and may be modified in many different ways without departing from the scope of the invention as defined by the accompanying claims.

The invention claimed is:

1. A valve for controlling a flow of a fluid, the valve comprising: a sealing plate comprising a plurality of ports for passage of the fluid through the sealing plate in a direction substantially perpendicular to a plane of the sealing plate; and a plurality of valve members, each valve member of the plurality of valve members comprising at least one anchor portion arranged in a fixed relationship with the sealing plate and a closure portion contiguous with the at least one anchor portion and in a movable relationship with the sealing plate under a differential pressure of the fluid across the valve, the closure portion movable away from the sealing plate under a first differential pressure direction to open at least one port of the plurality of ports and toward the sealing plate under a second and opposite differential pressure direction to close said at least one port of the plurality of ports, wherein the at least one anchor portion of the plurality of valve members partitions the closure portions from each other to define a plurality of valve cells, each valve cell of the plurality of valve cells comprising one of the valve members and at least one associated port; wherein an anchor portion of at least one of the valve members comprises an anchor portion of an adjacent one of the valve members; wherein each of the plurality of valve cells has a length of less than 1000 pm, the closure portion is movable away from the sealing plate under the first differential pressure by a distance of less than 100 pm, and the material of the one of the valve members has a Young's Modulus less than 50 GPa, a thickness less than 50 um, and a density less than 3000 kg/m3 such that the plurality of valve members are structurally configured to operate at a frequency of at least 20 kHz.

2. The valve according to claim 1, wherein at least one of the valve members is non-contiguous with an adjacent one of the valve members.

3. The valve according to claim 1, wherein each valve member comprises a portion of a unitary sheet of the valve.

4. The valve according to claim 3, wherein an anchor portion of at least one of the valve members is connected to an anchor portion of an adjacent one of the valve members by an intermediary portion of the unitary sheet.

5. The valve according to claim 1, wherein at least one of the valve members comprises a single anchor portion located on the sealing plate adjacent a port of the plurality of ports, the closure portion of the at least one of the valve members comprising a flap, the flap arranged to extend over the port in contact with the sealing plate so as to cover the port, the flap pivotable about the single anchor portion and movable away from the sealing plate under the first direction of the differential pressure to open the port and to the sealing plate under the second and opposite direction of the differential pressure to close the port.

6. The valve according to claim 1, further comprising a retention plate located on the sealing plate, the anchor portions disposed between the retention plate and the sealing plate, the retention plate attached to the sealing plate to fix the anchor portions relative to the sealing plate, the retention plate comprising a plurality of holes, wherein each hole of the plurality of holes of the retention plate is aligned with an associated one of the plurality of ports of the sealing plate.

7. The valve according to claim 6, wherein the retention plate is porous.

8. The valve according to claim 6, wherein the anchor portions are fixedly bonded to the sealing plate by an adhesive.

9. The valve according to claim 1, wherein the sealing plate is constructed from at least one of a metal, a metal alloy or a polymer material; and wherein at least one of the plurality of valve members is constructed from one of a metal, a metal alloy, a polymer material, or a semi-conductor material.

10. The valve according to claim 1, wherein:
each of the plurality of valve cells has a length of less than 500 μm, the closure portion is movable away from the sealing plate under the first differential pressure by a distance of less than 50 μm, and the material of the one of the valve members has a thickness less than 10 μm, and a density less than 1500 kg/m3.

* * * * *